United States Patent [19]

Beadles

[11] Patent Number: 4,757,541
[45] Date of Patent: Jul. 12, 1988

[54] AUDIO VISUAL SPEECH RECOGNITION

[75] Inventor: Robert L. Beadles, Durham, N.C.

[73] Assignee: Research Triangle Institute, Research Triangle Park, N.C.

[21] Appl. No.: 936,954

[22] Filed: Dec. 1, 1986

Related U.S. Application Data

[63] Continuation of Ser. No. 794,602, Nov. 5, 1985, abandoned, which is a continuation of Ser. No. 621,138, Jun. 15, 1984, abandoned, which is a continuation of Ser. No. 320,120, Nov. 10, 1981, abandoned.

[51] Int. Cl.⁴ .............................................. G10L 5/00
[52] U.S. Cl. ....................................................... 381/43
[58] Field of Search ................................... 381/41–43; 382/2, 25, 30, 36; 364/513.5

[56] References Cited

U.S. PATENT DOCUMENTS 3,805,238  4/1974  Rothfield ................................. 382/2
3,896,266  7/1975  Waterbury .......................... 179/1 SB
3,919,479  11/1975  Moon et al. ....................... 179/1 SB Primary Examiner—Manuel S. Kemeny
Attorney, Agent, or Firm—Cushman, Darby & Cushman

[57] ABSTRACT

A method and apparatus for indicating at least some of a sequence of spoken phonemes in which detected sounds are analyzed to determine a group of phonemes to which a phoneme belongs, the lipshape is optically detected and the respective signals correlated by a computer to indicate the detected phoneme.

5 Claims, 2 Drawing Sheets

| PHONEME CLASS | VOICED / UNVOICED | FLATTENED | ROUNDED | OPEN |
|---|---|---|---|---|
| VOWELS | | I, i / ε, ʌ | u / ɜ, o | ae / ɔ / ɑ |
| NASALS | | m | | n, ŋ |
| GLIDES & SEMIVOWELS | | j | w, r | l |
| STOPS | | b / P | | d, g / t, k |
| FRICATIVES | | z, v / s, f | ʒ / ʃ | ʒ / θ, h |

F I G. 1

AUDIO VISUAL SPEECH RECOGNITION

This is a continuation of application Ser No. 794,602, filed Nov. 5, 1985, which was abandoned upon the filing hereof, which is a continuation of application Ser. No. 621,138, filed June 15, 1984, which was abandoned upon the filing hereof, which is a continuation of application Ser. No. 320,120, filed 11-10-81, now abandoned.

The invention relates to a method and apparatus for producing an output indicating at least some spoken phonemes.

The primary method by which men communicate is speech. Communication between people by speech and hearing has many advantages over written communication. A person can speak at least ten times as fast as he can write, at least four times as fast as a skilled typist can work. Because of the many advantages and myriad uses of speech, the capability to recognize speech by an apparatus has long been recognized as an extremely desirable technological goal. For example, a reasonable cost limited vocabulary speech recognizer could replace the nowexisting inputs as the interface between man and the digital computer. Such an apparatus would revolutionize modern office practices by providing typewritten copy from voice input. Many military applications exist in command, control, intelligence and in electronic communication where such an apparatus would prove invaluable.

Another great need for such an apparatus is in assisting communications between hearing impaired or deaf people and hearing people. The difficulties in such communication have long handicapped deaf people in full integration into their community and in achieving the same levels of education, employment, and social advancements which they would otherwise achieve. The use of hand signals, although slower than spoken speech, can be used between those hearing impaired persons who are sufficiently motivated to learn the signs, but is impractical as a mode of communication with the general public. By observation of the movements of the lips of the speaking person, a hearing impaired or deaf person can discern that each sound is one of a limited number of the possible speech sounds called phonemes. Unfortunately, the ambiguities in lipreading for a totally deaf person are too great for effective understanding by most people using only lipreading.

Previous attempts to recognize phonemes by analysis of speech sounds have not been successful in producing sufficiently accurate indices to be an effective aid to the deaf in communication. The best computer speech recognition to date has required a modest recognized vocabulary and a speaker especially trained in the pronunciation of phonemes, and training of the system to the idiosyncracies of each new speaker's voice. Even when adapting for individual speakers, typically women's and children's voices are recognized less well. Recognition of each word except for a limited vocabulary further has required many times as long as the speaking of the word, precluding real time speech recognition. These limitations have made such speech recognition devices unsatisfactory as general purpose devices and of extremely limited use to the deaf community.

While more and more sophisticated techniques have been developed for analyzing and determining the identity of a specific phoneme, such techniques have not been successful in telling apart considerable numbers of phonemes which in fact sound very similar. Resolution of the identity of these phonemes by a hearer is often done on the basis of visual confirmation, context and familiarity with the speaker, operations which are difficult at best in previous machine implemented systems. In fact, visual information in some circumstances is given greater weight by the human brain than acoustic information in normal speech perception.

Fortunately, those ambiguities which are very difficult to differentiate from the sounds of the phonemes can often be differentiated by the appearance of the lips and palate. This has been recognized in the technique called manual cuing in which communication with the deaf is expedited utilizing hand cues to remove sufficient ambiguities to make lipreading practical.

In the present invention, a sufficient number of phonemes in a sequence of spoken phonemes can be recognized to provide effective and practical communication. This is achieved by combining analysis of the phoneme sounds which determines to which of a number of groups of phonemes each of the sounds belongs with optical scanning which determines which of a number of lip shapes are being made by the speaker in association with production of that phoneme. Correlating signals produced by the sounds and the optical scanning will produce sufficient indications of the spoken sounds to be practical. The number of recognized phonemes will depend upon the sophistication of the optical and sound analysis, the precision of expression of the speaker, and how much guessing and wrong phonemes are appropriate for any given application. The present invention is particularly useful in that it is amenable to many different applications and can be carried out at different levels of sophistication depending on desired accuracy.

Other objects and purposes of the invention will be clear from the following detailed description of the drawings.

BRIEF DESCRIPTION OF THE DRAWINGS

FIG. 1 shows a chart of phonemes separated into lip shape and sound groups;

DETAILED DESCRIPTION OF THE DRAWINGS

Figure 2:
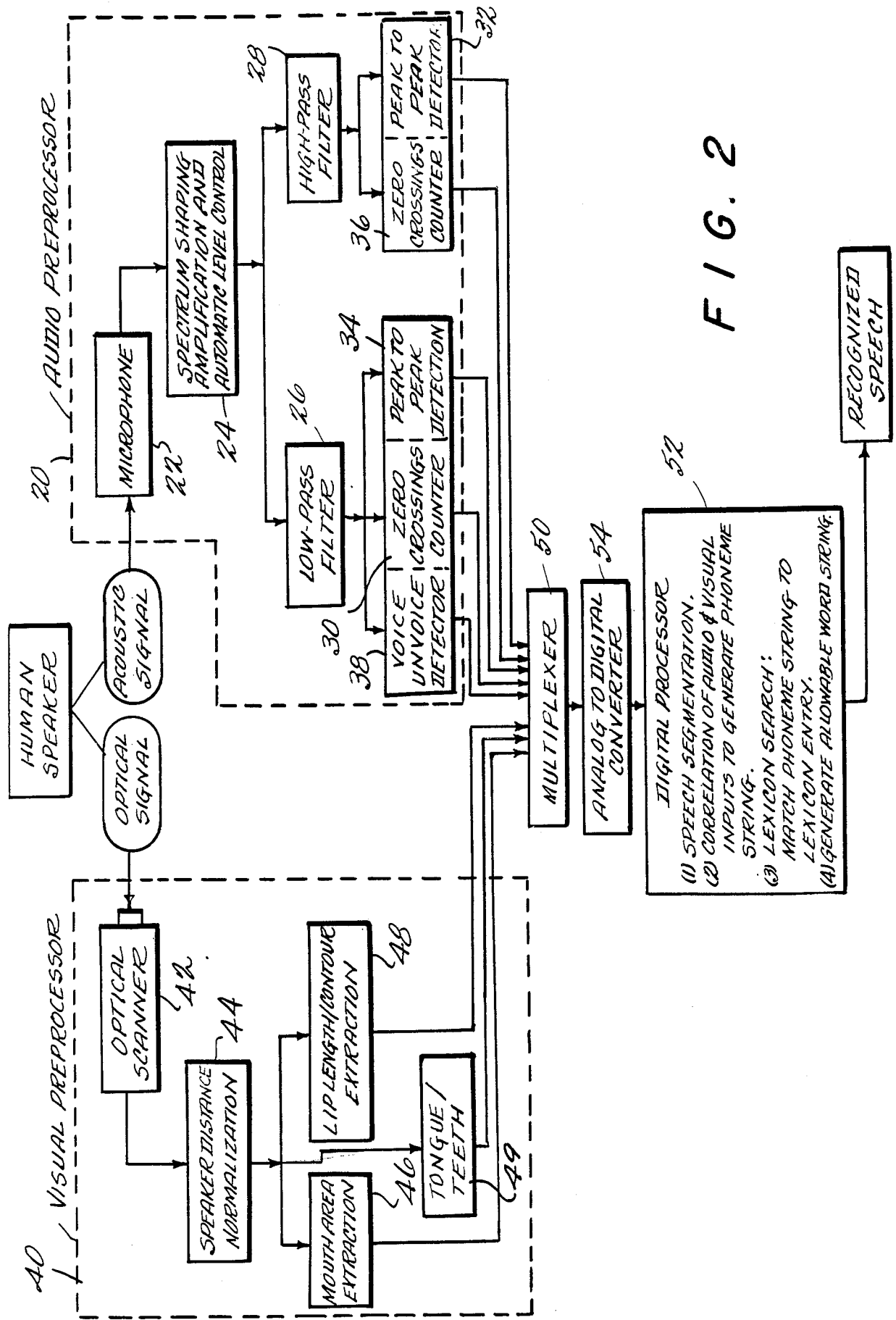
FIG. 2 shows a block diagram of the present invention.

Reference is now made to FIG. 1 which shows a chart showing one possible selection of sound groups and lip-shape groups suitable for use in the present invention. It will be understood that while the phonemes shown in FIG. 1 are those of the English language, similar groupings can be made for other human languages as well. In FIG. 1, the phoneme sounds are separated into five groups of vowels, nasals, glides and semi-vowels, stops, and fricatives. These are well known groupings of phonemes. The voiced sounds are below the slash line with the unvoiced sounds shown above. The lip shapes are classified into three shapes which can be readily differentiated by analysis of signals produced by optical scanning. The classes are of a flattened, rounded and open lip shape. These lip shapes can be readily differentiated using conventional optical scanning techniques, but additional lip-shapes or facial or palate positions can be utilized.

Some of the groups of sounds can be completely defined by reference to the lip shape, for example, the phoneme "w" while other sounds can only be resolved to an ambiguity of several sounds. Resolution of these choices can sometimes be made by comparison of preceding and succeeding phonemes, or symbols can be visually or otherwise displayed to permit a viewer to resolve ambiguities in the same way that ambiguities are resolved by the mind in analyzing speech sounds normally heard.

Reference is now made to FIG. 2 which illustrates a block diagram of the present invention. As noted, an audio preprocessor 12 detects the sounds produced by a human speaker and those sounds are converted into an electrical signal by a conventional microphone or similar device. The electrical signal thus produced is applied to a spectrum shaping amplification and automatic level-control circuit 24. The output of circuit 24 is applied to both low pass filter 26 and high pass filter 28. The outputs of the filters are applied to zero crossing counters 30 and 32 and peak to peak detectors 34 and 36. The output of the low pass filter in addition is applied to a circuit 38 for detecting the difference between voiced and unvoiced sounds. These circuits are well known in the art, and are discussed further in an application entitled METHOD AND APPARATUS FOR AUTOMATIC CUING, Ser. No. 198,211, filed Oct. 17, 1980, and in an article by R. W. Schafer, "Digital Signal Processing and Speech Analysis and Synthesis", *Proceedings of the IEEE Fall Electronics Conference,* Chicago, Ill., October 1971, pages 29-30. The disclosures of this article and the above-mentioned patent application are hereby incorporated into the present application by reference. Other methods of acoustic analysis such as linear prediction and short time spectral analysis can alternatively be employed in either analog, digital or combination forms.

Visual preprocessor 40 includes a conventional optical scanner 42, for example, a television camera, which produces a sequence of electrical signals indicating at a plurality of discrete locations the intensity of light received. Selective optical filtering before input in scanner 42 enhances the contrast of various mouth features with respect to other features. Light level is detected and compensation therefor carried out. Scanner 42 is positioned to view the face of the speaker, particularly the lips, and can be in the form of a portable or a permanent installation. The electrical output of the scanner in the nature of a sequence of digital signals or the like is applied to a speaker normalization circuit 44 which in effect magnifies or reduces the size of the image to a standard. One normalization technique is to store in an analog or digital memory a standard face template and compare the stored template with the scanner image. An electrically controlled zoom lens is then operated to normalize the scanner to speaker distance.

The standard scan image is next analyzed by circuit 46 to determine the size of the open mouth, for example, by determining lip length and contour and then integrating. The length and contour of the lips is determined by circuit 48. Standard techniques for optical image line enhancement, such as differentiation of the optical image, can be used to facilitate extraction of both lip contour and mouth area. These well known techniques are described in greater detail in *Optical and Electric-Optical Information Processing* published by MIT Press in 1965.

The tongue and teeth positions are also detected by tongue/teeth detector 49, for example to determine if the teeth and tongue are visible. The teeth can be detected by their characteristic shape and reflectivity relative to the lips and tongue. It will be recognized by one skilled in the art that the functions performed by circuits 46, 48 and 49 can be performed by analog or digital techniques or appropriate combinations thereof.

The output signals from preprocessors 20 and 40 are applied to multiplexer 50 and from there applied to a digital computer 52 directly for digital outputs and via an analog-to-digital converter 54 for analog outputs. Computer 52 carries out time aligned correlation between the audio and visual signal and produces an output for example, in visual or typewritten form indicating at least some of the individual phonemes being spoken.

Many changes and modifications in the above-described embodiment of the invention can, of course, be carried out without departing from the scope thereof, that scope being intended to be limited only by the scope of the appended claims.

What is claimed is:

1. An apparatus for producing an output indicating at least some of a sequence of spoken phonemes from a human speaker comprising:

means for detecting sounds and converting said sounds into an electrical signal;

means for analyzing said signal to detect said phonemes to produce an electrical acoustic output signal indicating for each of at least some of said detected phonemes one group of a plurality of phoneme groups including the detected phoneme, each of said phoneme groups including at least one phoneme;

means for optically scanning the face of said speaker and producing an electrical lipshape signal representing the visual manifestation for at least some of said spoken phonemes indicating one of a plurality of lipshapes, each lipshape being associated with at least one phoneme; and means for receiving and correlating said lipshape signal and said acoustic output signal to produce said output.

2. An apparatus as in claim 1 wherein said receiving and correlating means includes a multiplexer for receiving signals from said scanning and analyzing means, an analog to digital converter connected to the output of said multiplexer and a digital computer connected to the output of said converter.

3. An apparatus as in claim 1 or 2 wherein said scanning means includes an optical scanner, means for normalizing the distance between said scanner and the speaker's lips, means for extracting the mouth area, means for extracting the lip contour and means for detecting teeth and tongue positions.

4. An apparatus as in claim 1 or 2 wherein said analyzing means includes a low pass filter, means for analyzing the output of said low pass filter, a high pass filter and means for analyzing the output of said high pass filter.

5. A method of producing an output indicating at least some of a sequence of spoken phonemes from a human speaker comprising the steps of:

detecting sounds and converting said sounds into an electrical signal;

analyzing said signal to detect said phonemes to produce an electrical acoustic output signal indicating for each of at least some of said detected phonemes one group of a plurality of phoneme groups including the detected phoneme, each of said phoneme groups including at least one phoneme;

optically scanning the face of said speaker and producing an electrical lipshape signal representing the visual manifestation for at least some of said spoken phonemes indicating one of a plurality of lipshapes, each lipshape being associated with at least one phoneme; and correlating said lip-shape signal and said acoustic output signal to produce said output.

* * * * *